(12) United States Patent
Schmulenson et al.

(10) Patent No.: US 7,607,831 B2
(45) Date of Patent: Oct. 27, 2009

(54) RING GUIDE ADAPTER

(76) Inventors: Harold K. Schmulenson, 105 Old Barn Ct., Buffalo Grove, IL (US) 60089; Tom Gillen, 18035 Esther Dr., Orland Park, IL (US) 60467

( * ) Notice: Subject to any disclaimer, the term of this patent is extended or adjusted under 35 U.S.C. 154(b) by 0 days.

(21) Appl. No.: 11/742,947

(22) Filed: May 1, 2007

(65) Prior Publication Data
US 2007/0280424 A1 Dec. 6, 2007

Related U.S. Application Data

(63) Continuation-in-part of application No. 10/985,381, filed on Nov. 11, 2004, now Pat. No. 7,226,208.

(51) Int. Cl.
*A61B 6/14* (2006.01)
(52) U.S. Cl. ..................... 378/170
(58) Field of Classification Search .............. 378/168, 378/170
See application file for complete search history.

(56) References Cited

U.S. PATENT DOCUMENTS

| | | | |
|---|---|---|---|
| 1,434,894 A | 11/1922 | Hawkins |
| 1,557,796 A | 10/1925 | Bonar et al. |
| 1,706,117 A | 3/1929 | Heckel |
| 2,005,993 A | 8/1935 | Heron et al. |
| 2,075,491 A | 3/1937 | Wilson |
| 2,090,933 A | 8/1937 | Bolin et al. |
| 2,239,569 A | 4/1941 | Poindexter |
| 2,240,336 A | 4/1941 | Kreider |
| 3,304,422 A | 2/1967 | Norback et al. |
| 3,356,845 A | 12/1967 | Bergendal |
| 3,473,026 A | 10/1969 | Updegrave |
| 4,075,494 A | 2/1978 | Jermyn |
| 4,150,296 A | 4/1979 | Edeland et al. |
| 4,251,732 A | 2/1981 | Fried |
| 4,295,050 A | 10/1981 | Linden |
| 4,365,162 A | 12/1982 | Jarby |
| 4,484,342 A | 11/1984 | Allison et al. |
| 4,489,427 A | 12/1984 | Allison et al. |
| 4,554,676 A | 11/1985 | Maldonado et al. |
| 4,707,847 A | 11/1987 | Van Aken |
| 4,815,117 A | 3/1989 | Waldo |
| 4,866,750 A | 9/1989 | Chavarria et al. |
| 4,945,553 A | 7/1990 | Willis |

(Continued)

FOREIGN PATENT DOCUMENTS

DE    8701308 U1 *    3/1987

OTHER PUBLICATIONS

International Search Report and Written Opinion dated Feb. 14, 2006 for PCT application No. PCT/U52005/040854.*

(Continued)

*Primary Examiner*—Chih-Cheng G Kao
(74) *Attorney, Agent, or Firm*—Rozenblat IP LLC

(57) ABSTRACT

A system for holding and aligning an x-ray sensing device is described. The system includes a holder for an x-ray sensing device and a ring guide adapter which is removably connected with the holder. The ring guide adapter forms first and second alignment members. The system also includes a rod which is removably connected with either the first or second alignment member of the ring guide adapter.

20 Claims, 17 Drawing Sheets

U.S. PATENT DOCUMENTS

| | | | |
|---|---|---|---|
| 4,949,370 | A | 8/1990 | Tanaka |
| 4,965,885 | A * | 10/1990 | Fuhrmann .................... 378/168 |
| 5,022,065 | A | 6/1991 | Wijkstrom |
| 5,044,009 | A | 8/1991 | Klauser |
| 5,090,047 | A | 2/1992 | Angotti et al. |
| 5,289,522 | A | 2/1994 | Kanbar et al. |
| 5,327,477 | A | 7/1994 | Levy |
| 5,473,662 | A | 12/1995 | Barish |
| 5,625,666 | A | 4/1997 | Willis |
| 5,629,972 | A | 5/1997 | Hausmann et al. |
| 5,652,779 | A | 7/1997 | Levy et al. |
| 5,677,537 | A | 10/1997 | Pfeiffer |
| 5,737,388 | A | 4/1998 | Kossila |
| 5,799,058 | A | 8/1998 | Willis et al. |
| 6,033,111 | A | 3/2000 | Winters et al. |
| 6,102,566 | A | 8/2000 | Willis |
| 6,190,042 | B1 | 2/2001 | Dove et al. |
| 6,343,875 | B1 | 2/2002 | Eppinger et al. |
| 6,461,038 | B2 | 10/2002 | Pellegrini et al. |
| 6,540,399 | B1 | 4/2003 | Eppinger et al. |
| 6,592,256 | B2 | 7/2003 | Da Rold et al. |
| 6,905,244 | B2 | 6/2005 | Kilcher et al. |
| 6,932,505 | B2 | 8/2005 | Yao et al. |
| 7,226,208 | B2 | 6/2007 | Schmulenson |
| 2002/0076002 | A1 | 6/2002 | Eppinger et al. |
| 2002/0106057 | A1 | 8/2002 | Halpert |
| 2003/0185347 | A1 | 10/2003 | Diederich |
| 2004/0028187 | A1 | 2/2004 | Diederich |
| 2004/0170253 | A1 * | 9/2004 | Landis et al. ............... 378/168 |
| 2005/0013412 | A1 | 1/2005 | Calderwood et al. |
| 2005/0047550 | A1 | 3/2005 | Yao et al. |
| 2006/0188070 | A1 | 8/2006 | Razzano et al. |
| 2007/0280424 | A1 | 12/2007 | Schmulenson et al. |
| 2008/0025468 | A1 | 1/2008 | Schmulenson et al. |

OTHER PUBLICATIONS

International Search Report and Written Opinion dated Mar. 5, 2007 for PCT application No. PCT/U52006/033028.*
Sensor and X-Ray Holder - Dec. 2004 — Dentslpy/Rinn Snap A Ray.
Sensor Mounted in X-Ray Holder - Dec. 2004 — Dentslpy/Rinn Snap A Ray.
Uni-bite Film Holder - Unident - "American Dental Accessories Catalog" — Summer 2005.
X-Ray Holders - "American Dental Accessories Catalog" - Summer 2005.
Sensor-Pro Digital Sensor Holder - Op-de_Op Sensor Pro - "American Dental Accessories Catalog" - Summer 2005.
Sensor (black) Next to Standard X-Ray - Dec. 2004 — Dentslpy/Rinn Snap A Ray.
Sensor Mounted in X-Ray Holder - Dec. 2004 — Dentslpy/Rinn Snap A Ray.

* cited by examiner

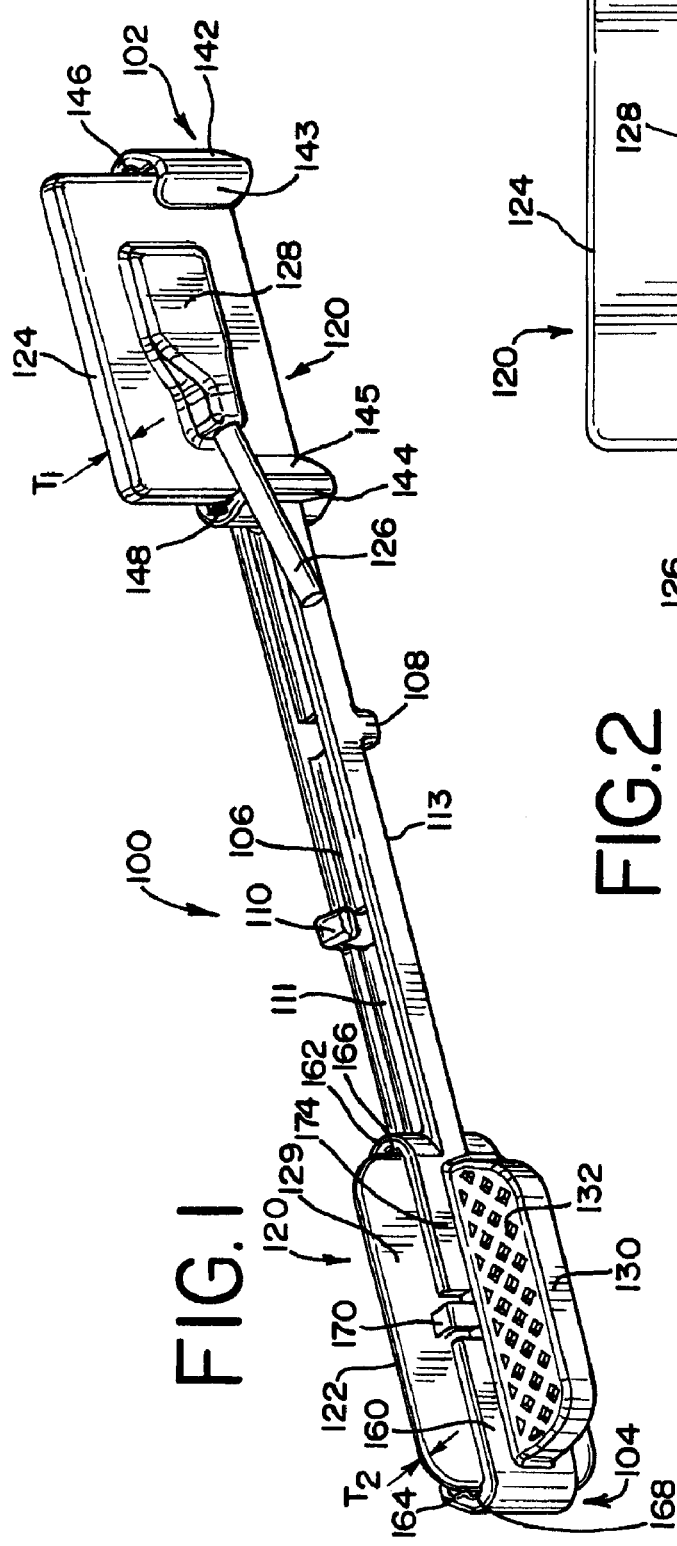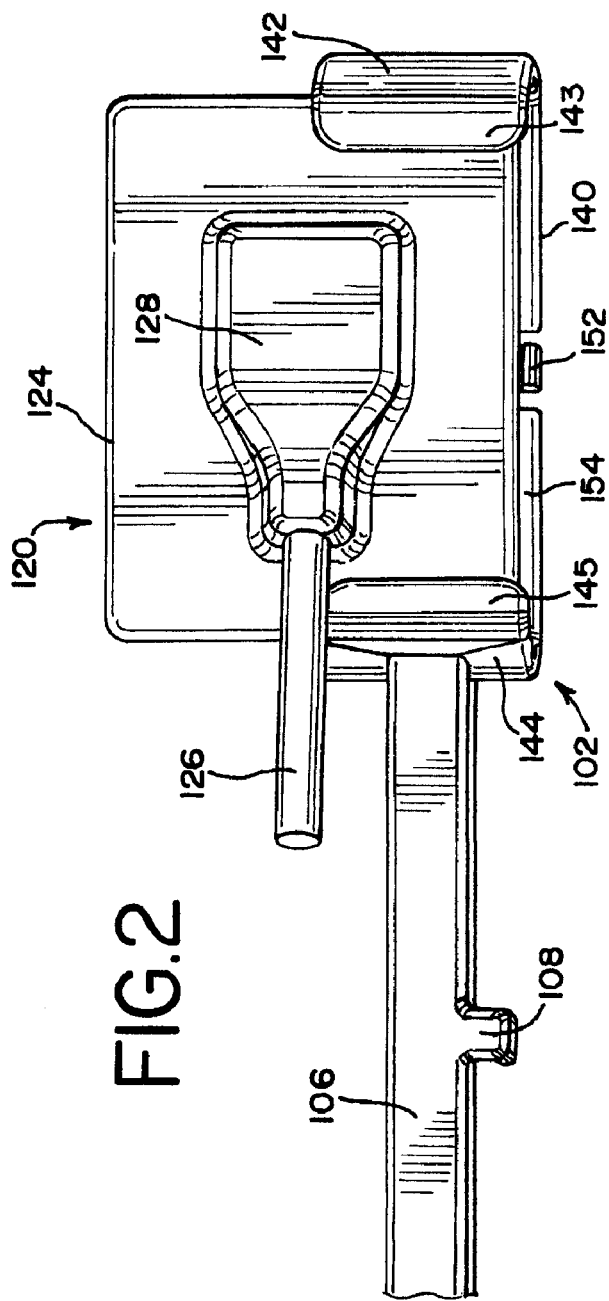

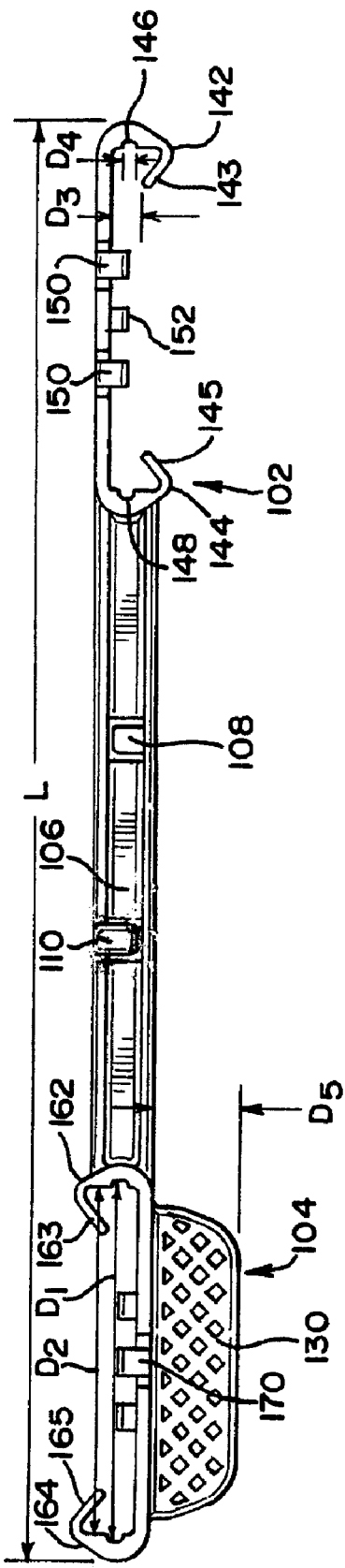

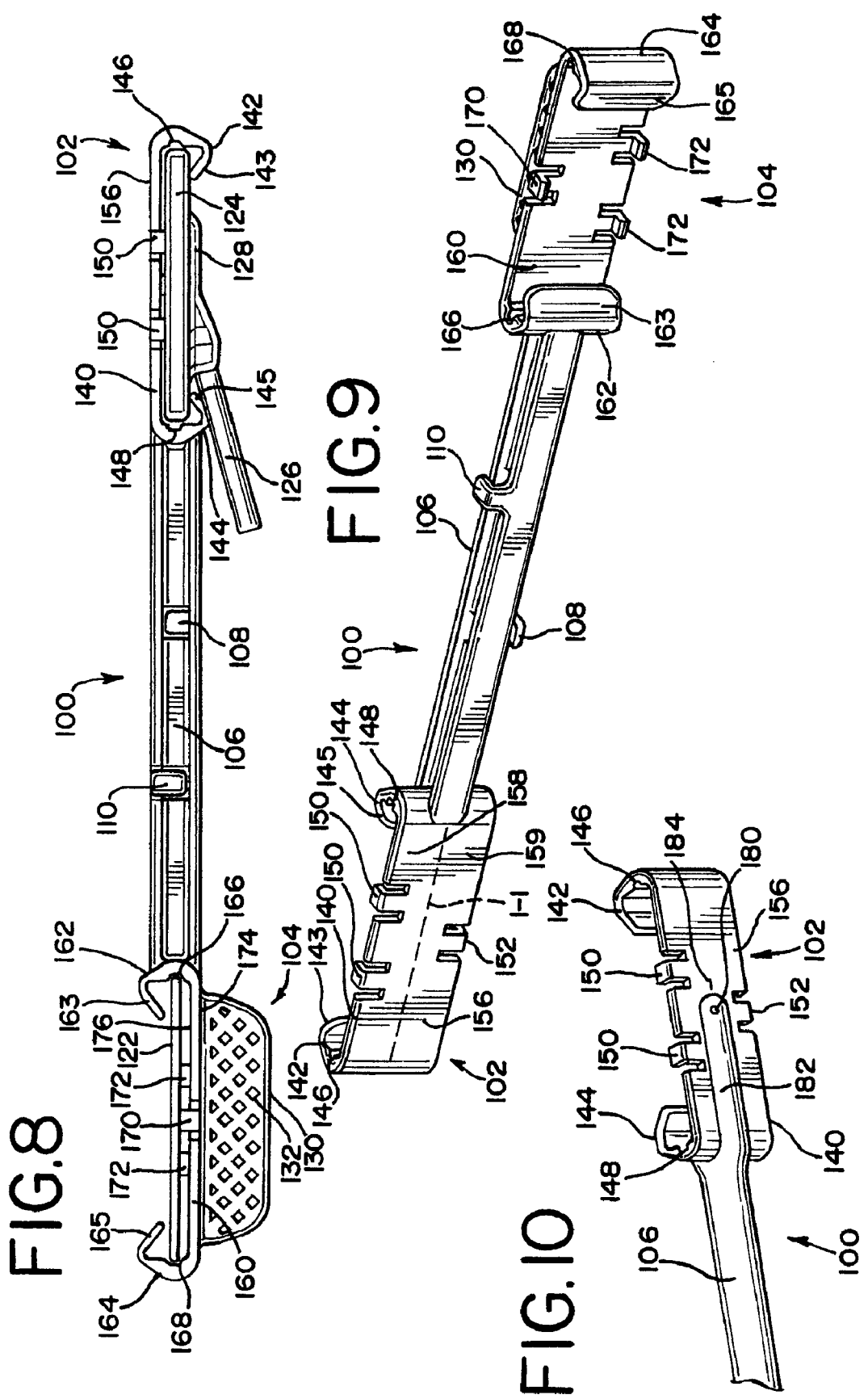

RING GUIDE ADAPTER

CROSS-REFERENCE TO RELATED APPLICATIONS

This continuation-in-part application claims the benefit and priority of U.S. patent application Ser. No. 10/985,381, filed Nov. 11, 2004 now U.S. Pat. No. 7,226,208.

BACKGROUND

This invention relates generally to sensor holders, and in particular, to an adapter for connecting a first type of rod and ring to a second type of holder for a dental x-ray sensing device.

Dental radiographs are made using x-ray examination units, often including an x-ray cone or tube positioned proximate the patient and aligned to take x-rays of certain teeth. Dental x-ray sensing devices, which include including x-ray film units, digital x-ray sensors, charge coupled devices, phosphor imaging plates or the like, often have a generally flat or plate-like configuration and standardized dimensions so that the sensing device can be placed into the oral cavity.

The sensing device is placed into the patient's mouth and held in place proximate to the tooth or teeth to be examined. The x-ray's are directed through the target teeth and then through the sensor. It has been found that proper orientation of the sensor is required to eliminate distortions and improper focus.

To ensure proper orientation of the sensing device, sensor carriers or holders with "bite blocks" have been developed. These devices often have a plate for holding the sensing device and a bite block that the patient bites down upon to position the device and the carried sensor. A bite block is shown for example, in U.S. Pat. No. 3,473,026.

Different sensing devices are often used depending upon the area of the mouth to be examined. This may include for example, endo, posterior, anterior, left, right, upper and lower bite wings, and the like. Known bite blocks and sensor holders have been individually designed and manufactured for each different type of sensing device. The dimensions of the sensing device and the holder dictate the degree of secured positioning of the sensing device in the holder.

A dental professional may have a large number of x-ray sensing devices with varying sizes and shapes, and hence, a similarly large number of sensor holders. The dental professional is often faced with employing a different sensing device or set of sensing devices, holders and bite blocks depending upon the particular x-ray procedure being employed and the area of the mouth to be examined. At best, it is time consuming to change between sensing devices, sensor holders and bite blocks.

In order to precisely align the x-ray cone or tube with a particular x-ray sensing device held by a particular sensor holder, a rod and ring guide combination may be employed. The rod is typically attached to a particular sensor holder at one end and connected with the ring guide at the other end. The ring guide helps to aim the x-ray cone or tube at the x-ray sensing device. However, some times, in order to take x-rays of various different portions of the mouth, multiple sensor holders may need to be attached to a particular rod and ring guide combination.

A need exists therefore, for adapting a particular sensor holder for use with a particular rod and ring guide combination to take x-rays of various different portions of the mouth.

SUMMARY

The present invention is defined by the following claims, and nothing in this section should be taken as a limitation on those claims. By way of introduction, the preferred embodiments described below relate to a system for holding and aligning an x-ray sensing device. The system includes a holder for an x-ray sensing device and a ring guide adapter which is removably connected with the holder. The ring guide adapter forms first and second alignment members. The system also includes a rod which is removably connected with either the first or second alignment member of the ring guide adapter.

The preferred embodiments also relate to a ring guide adapter. The ring guide adapter includes a first and second alignment members. The first alignment member forms a first engagement member configured to mate with a complimentary second engagement member formed on a rod. The second alignment member is connected with the first alignment member. The second alignment member forms a third engagement member also configured to mate with the complimentary second engagement member formed on the rod. The ring guide adapter also includes a fourth engagement member configured to mate with a complimentary fifth engagement member of a holder for an x-ray sensing device.

The preferred embodiments also relate to a ring guide adapter for connecting a rod and ring guide with a holder for an x-ray sensing device. The ring guide adapter includes first and second alignment members. The first alignment member includes a first engagement member configured to mate with a complimentary second engagement member formed on the rod to align the rod for a first x-ray type. The second alignment member is connected with the first alignment member. The second alignment member includes a third engagement member configured to mate with the complimentary second engagement member formed on the rod to align the rod for a second x-ray type.

DESCRIPTION OF THE DRAWINGS

FIG. 1 depicts a perspective view of a holder for an x-ray sensor and/or an x-ray film unit, in accordance with one preferred embodiment of the invention.

FIG. 2 depicts an enlarged partial perspective view of a holder for an x-ray sensor and/or an x-ray film unit holding an x-ray sensor, in accordance with one preferred embodiment of the invention.

FIG. 6 depicts a top view of a holder for an x-ray sensor and/or an x-ray film unit, in accordance with one preferred embodiment of the invention.

FIG. 7 depicts a perspective view of a holder for an x-ray sensor and/or an x-ray film unit, in accordance with one preferred embodiment of the invention.

FIG. 8 depicts a top view of a holder for an x-ray sensor and/or an x-ray film unit, in accordance with one preferred embodiment of the invention.

FIG. 9 depicts a perspective view of a holder for an x-ray sensor and/or an x-ray film unit, in accordance with one preferred embodiment of the invention.

FIG. 10 depicts a partial perspective view of a holder for an x-ray sensor and/or an x-ray film unit, in accordance with one preferred embodiment of the invention.

Figure 3:
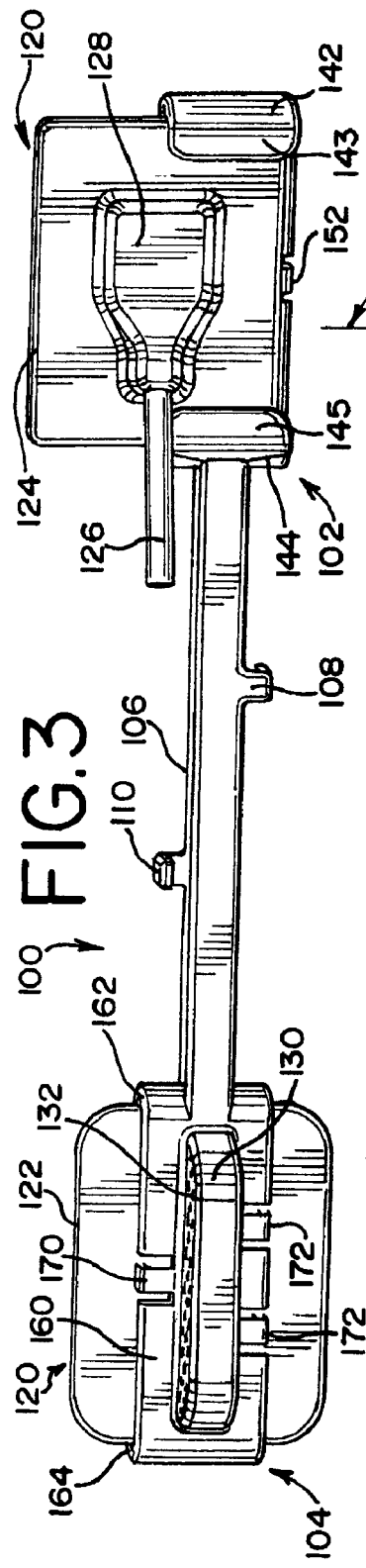
FIG. 3 depicts an enlarged partial perspective view of a holder for an x-ray sensor and/or an x-ray film unit holding an x-ray film unit, in accordance with one preferred embodiment of the invention.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

Referring to FIG. 1, there is shown a perspective view of a holder 100 for an x-ray sensing device 120, according to one preferred embodiment. The holder 100 is designed to hold and retain the x-ray sensing device 120 in a multitude of positions. Preferably, the holder 100 is manufactured using an injection molded process in order to reduce costs. However, holder 100 can be manufactured in one of many ways. For example, holder 100 may be machined, thermoformed, and hand-made. Preferably, in order to reduce costs and maintain rigidity, holder 100 is a one-piece unit which is integrally formed. However, holder 100 may comprise multiple parts which are then assembled and fitted together. Preferably, holder 100 is constructed from a rigid yet somewhat flexible material, such as but not limited to: metals such as iron, steel, stainless steel, aluminum, silver, titanium, and brass; plastics, such as ethylene, vinyl, acetate; acrylics, such as acrylonitrol-butadine-styrene; resins; and polymers such as polycarbonate. The holder 100 may be colored any one of various different colors depending on the size and type of sensors used. For example, the holder may be colored white for a size two x-ray film unit or colored green for a size zero x-ray film unit.

X-ray sensing device 120 is any device which can be used to sense radiation, and preferably x-ray radiation. As illustrated in FIGS. 1-5, x-ray sensing device 120 includes such devices as an x-ray film unit 122, which uses x-ray film 129 to detect x-rays, an x-ray sensor unit 124, which uses a digital x-ray sensor 128 or a charge coupled device to detect x-rays, a phosphor imaging plate or the like. X-ray sensor unit 124 may include a wire 126 which is used to provide power and/or transfer signals between the digital x-ray sensor 128 and a control unit, not shown. Preferably, x-ray sensing device 120 is a dental x-ray sensing device which is sized for use in the mouth of a patient in order to take x-ray scans of a patient's teeth.

The holder 100 includes a first retention member 102 and a handle 106 connected with the first retention member 102, as illustrated in FIGS. 1-3. The first retention member 102 includes a back plate 140, a first retention guide 142, and a second retention guide 144, as illustrated in FIGS. 1, 7, and 9. The first retention guide 142 is connected with an end of the back plate 140 and the second retention guide is connected with an opposing end of the back plate 140. The first retention guide 142 faces the second retention guide 144. Preferably, the back plate 140, the first retention guide 142, and the second retention guide 144 are integrally formed, as shown in FIGS. 1, 7, and 9. Preferably, each retention guide 142, 144 forms a generally u-shaped cross section.

More preferably, each retention guide 142, 144 forms a generally u-shaped cross section having a gripping portion 143, 145, respectively, wherein each gripping portion 143, 145 curves inwards towards the back plate 140, as illustrated in FIGS. 1, 6, 8, and 9. The gripping portions 143, 145 help to better hold the x-ray sensing device 120 in place and allow the holder 100 to accommodate a wide variety of x-ray sensing devices with varying thicknesses, such as both x-ray film units 122 and x-ray sensor units 124, as illustrated in FIGS. 1 and 8, or such as x-ray sensor units of varying thicknesses. Preferably, the gripping portions 143, 145 are apply enough pressure on the x-ray sensing device 120 to hold the device 120 in place without damaging the device 120. With this configuration, holder 100 can receive the x-ray sensing device 120, by sliding the x-ray sensing device 120 in between the first retention guide 142 and the second retention guide 144 and against the back plate 140, as illustrated in FIGS. 1-3.

Figure 4:
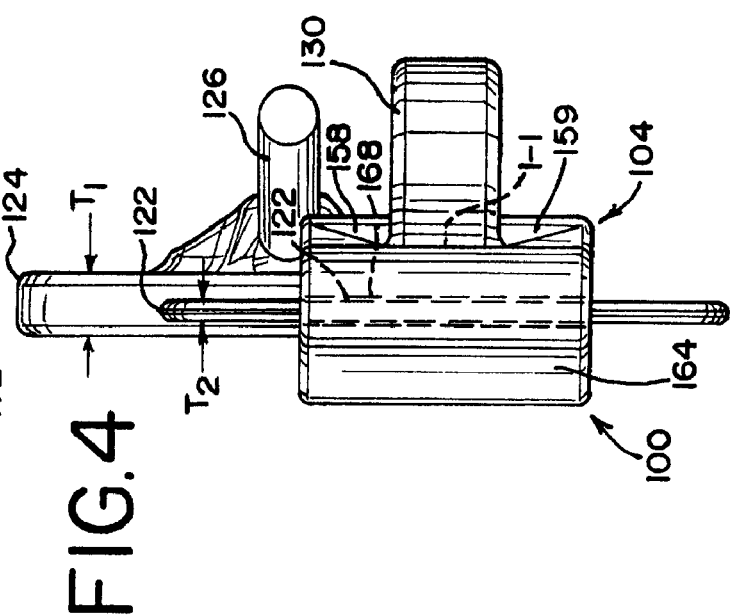
FIG. 4 depicts side view of a holder for an x-ray sensor and/or an x-ray film unit holding an x-ray sensor, in accordance with one preferred embodiment of the invention.

Preferably the retention guides 142, 144 are sized such that x-ray sensing device 120 fits firmly between the first retention guide 142 and the second retention guide 144 and against the back plate 140, as illustrated in FIGS. 1, 2, 8, and 9. Preferably each retention guide 142, 144 extends from an upper portion of the back plate 140 to a lower portion of the back plate 140, as illustrated in FIGS. 4 and 9. As defined herein, an upper portion of the back plate 140 is a portion of the back plate 140 that is within an upper half 158 of the back plate 140 and a lower portion of the back plate 140 is a portion of the back plate 140 that is within a lower half 159 of the back plate 140. Dividing the back plate 140 into two halves, wherein each half extends from the first retention guide 142 to the second retention guide 144, one half is the upper half 158 and the opposing half is the lower half 159, as illustrated in FIGS. 4 and 9, wherein the back plate 140 is divided into halves by imaginary line 1-1 located centrally in back plate 140.

In one embodiment the first retention member 102 includes a retention stop, such as an upper retention stop 150, on a front surface 154 of the back plate 140. The retention stop is preferably between the retention guides 142, 144, as illustrated in FIGS. 6-9. Preferably the first retention member 102 comprises an upper retention stop 150 connected with an upper portion of the back plate 140, and a lower retention stop 152 opposed to the upper retention stop 150 and connected with a lower portion of the back plate 140. Preferably both the upper and lower retention stops, 150, 152 are located between the retention guides 142, 144. The retention stops 150, 152 include a portion which extends away from the back plate 140 and allow for a user to position the x-ray sensing device 120 either towards the bottom portion of the back plate 140, or towards the upper portion of the back plate 140, as illustrated in FIGS. 2 and 7. By allowing a user to change the position of the x-ray sensing device 120 in this way, the holder 100 allows a user to position the x-ray sensing device 120 more accurately when x-ray either the upper or lower teeth in a patient's mouth. Preferably, each retention stop 150, 152 extends in a direction from the first retention guide 142 to the second retention guide 144, as illustrated in FIG. 7.

Preferably, the first retention member 102 includes flexible members 151, 153 attached to each retention stop 150, 152, respectively, at one end and attached to the back plate 140 at a second end, as illustrated in FIG. 7. The flexible members 151, 153 may be formed in the back plate 140, or may be formed on the back plate 140, and allow the retention stops 150, 152 to move back and forth upon insertion of an x-ray sensing device 120 into the first retention member 102. Additionally, by allowing the retention stops 150, 152 to move back and forth, the flexible members 151, 153 also allow the retention stops 150, 152 to apply an appropriate amount of pressure on the x-ray sensing device 120, such that the x-ray sensing device 120 is held in place yet not damaged. In one embodiment, the first retention member 102 includes more than one upper retention stop 150, as illustrated in FIG. 7. The additional retention stop 150 allows for better placement of the x-ray sensing device 120.

In one embodiment, each retention guide 142, 144 forms a retention groove 146, 148 for receiving an x-ray film unit 122, as illustrated in FIGS. 1, 4, and 6, and 8. The retention grooves 146, 148 forms a u-shape cross section which is smaller than the u-shaped cross section formed by each retention guide 142, 144. By forming a smaller u-shaped cross section, the retention grooves 146, 148 are better able to receive an x-ray film unit 122, since generally, the x-ray film unit 122 has a smaller thickness $T_2$ than a thickness $T_1$ of the x-ray sensor unit 124, as illustrated in FIG. 1. In this manner by using retention grooves 146 and 148, a single retention member 102, 104 is able to accommodate both an x-ray film unit 122 and an x-ray sensing device 120, as illustrated in FIGS. 1 and 8.

In one embodiment, the holder 100 includes a first wire retention member 108 on the handle 106, as illustrated in FIG. 1. Wire retention member 108 is able to accommodate and grasp a wire such as the wire 126 found in x-ray sensor unit 124. Preferably, the handle 106 also includes a groove 113 in which wire can reside in. Working in conjunction with wire retention member 108, groove 113 is able to accommodate and secure a wire such as the wire 126 found in x-ray sensor unit 124, therefore preventing the wire from becoming tangled within a user's mouth. Preferably, the wire retention member 108 is formed on the handle 106 adjacent the first retention member 102.

In one embodiment, the holder 100 includes a second wire retention member 110 on the handle 106, as illustrated in FIG. 1. Wire retention member 110 is able to accommodate and grasp a wire such as the wire 126 found in x-ray sensor unit 124. Preferably, the handle 106 also includes a groove 111 in which wire can reside in. Working in conjunction with wire retention member 110, groove 111 is able to accommodate and secure a wire such as the wire 126 found in x-ray sensor unit 124, therefore preventing the wire from becoming tangled within a user's mouth. Preferably, the wire retention member 110 is formed on the handle 106 adjacent a second retention member 104.

In one embodiment, the holder 100 includes a second retention member 104 connected with the handle 106, wherein the second retention member 104 is opposed to the first retention member 102. The second retention member 104 functions essentially the same way as the first retention member 102 and may include many of the same elements as found in the first retention member 102. In one embodiment, the second retention member 104 includes a back plate 160, retention guides 162, 164, gripping portions 163, 165, retention grooves 166, 168, an upper retention stop 170, and a lower retention stop 172, as illustrated in FIGS. 1, 3, and 6-9. Preferably, the first retention member 102 is connected with one end of the handle 106 and the second retention member 104 is connected with an opposing end of the handle 106 as illustrated in FIG. 1. Preferably, the first and second retention members 102, 104 are each sized differently so that each retention member 102, 104 can accept an x-ray sensing device 120 of a different size. For example, in one embodiment the first retention member 102 may be sized to accept a first x-ray sensing device 120 and a second retention member 104 may be sized to accept a second x-ray sensing device 120, wherein the size of the first x-ray sensing device 120 is not equal to the size of the second x-ray sensing device 120.

In one embodiment, the holder 100 comprises a bite block 130 on a back surface 174 of the back plate 160, wherein the back surface 174 opposes a front surface 176, as illustrated in FIGS. 1 and 8. The bite block 130 is preferably positioned centrally on the back plate between the upper retention slot 170 and lower retention slot 172 as illustrated in FIG. 3. When the holder 100 is inserted into a patient's mouth, the patient is able to bite down with the patient's teeth on the bite block 130 and engage the first retention member 102. The bite block 130 allows for more accurate positioning of the holder 100, and more specifically the first retention member 102 and the sensor 120, within a patient's mouth. Preferably, the bite block 130 includes a series of serrations 132, as illustrated in FIGS. 1 and 6, in order to provide additional grip and less movement for the holder 100 within the patient's mouth. Preferably, the serrations 132 are diamond shaped and are indented into the bite block.

As illustrated in FIG. 6, the length L from one end of the holder 100 to another end of the holder 100 in a direction from a first retention member to a second retention member 104, is approximately between 5 and 50 centimeters and more preferably between 10 and 30 centimeters and most preferably between 15 and 25 centimeters. Additionally, the distance $D_1$ between a first retention groove 146 and a second retention groove 148 is preferably between 3 and 8 centimeters. Additionally, a distance $D_2$ between a first retention guide 142 and a second retention guide 144, as illustrated in FIG. 6, is preferably between 3 and 8 centimeters. A distance $D_3$ between the back plate 140 and a far end of a retention guide 142, 144, as illustrated in FIG. 6, is preferably between 1 and 20 millimeters, and more preferably, between 2 to 10 millimeters, and a distance $D_4$ between one end of the retention groove and a second end of the retention groove, as illustrated in FIG. 6, is approximately between 0.1 and 4 millimeters, and more preferably, between 0.5 and 3 millimeters. A distance $D_5$ from the back surface of the back plate 140 to a distal surface of the bite block 130, as illustrated in FIG. 6, is preferably between 1 and 3 centimeters.

Figure 5:
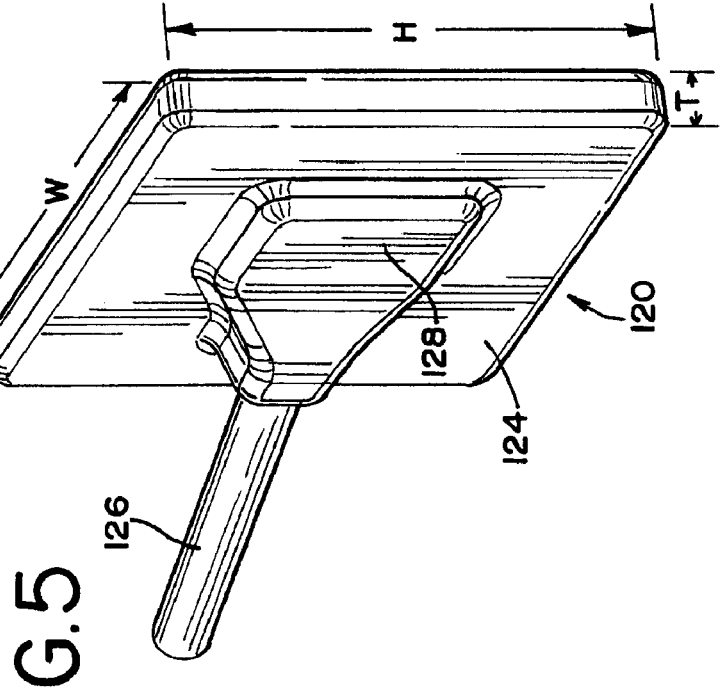
FIG. 5 depicts a perspective view of an x-ray sensor, in accordance with one preferred embodiment of the invention.

X-ray sensing devices 120 can vary in width W, height H and thickness T as illustrated in FIG. 5. Preferably the width W of the x-ray sensing device 120 is between 3 and 8 centimeters. Also preferably the height H of the x-ray sensing device 120 is between 1 and 4 centimeters and the thickness T is preferably between 0.1 and 20 millimeters, and more preferably, between 1 to 10 millimeters.

In one embodiment, the holder 100 includes a pivoting member 182 attached to the back plate 140 of the first retention member 102 at a pivot point 180 and connected with the handle 106, as illustrated in FIG. 10. The pivoting member 182 allows the first retention member 102 to be pivoted at the pivot point 180, thus providing the holder 100 with the ability to rotate the retention member 102 at a variety of angles with respect to the handle 106. The pivoting member 182 also provides the user with a variety of configurations in which the holder may be placed, and therefore provides the user with additional flexibility when positioning the holder 100, and more specifically, the retention member 102. Preferably, the back plate 140 includes a series of stops 184 projecting radially outwards from the pivot point 180. The stops 184 may either be in the form of grooves formed in the back surface 156 or in the form of projections formed on the back surface 156. The stops 184 engage the pivoting member 182 and stop the pivoting member 182 from pivoting at preselected angles with respect to the handle 106, as illustrated in FIG. 10.

Figure 11:
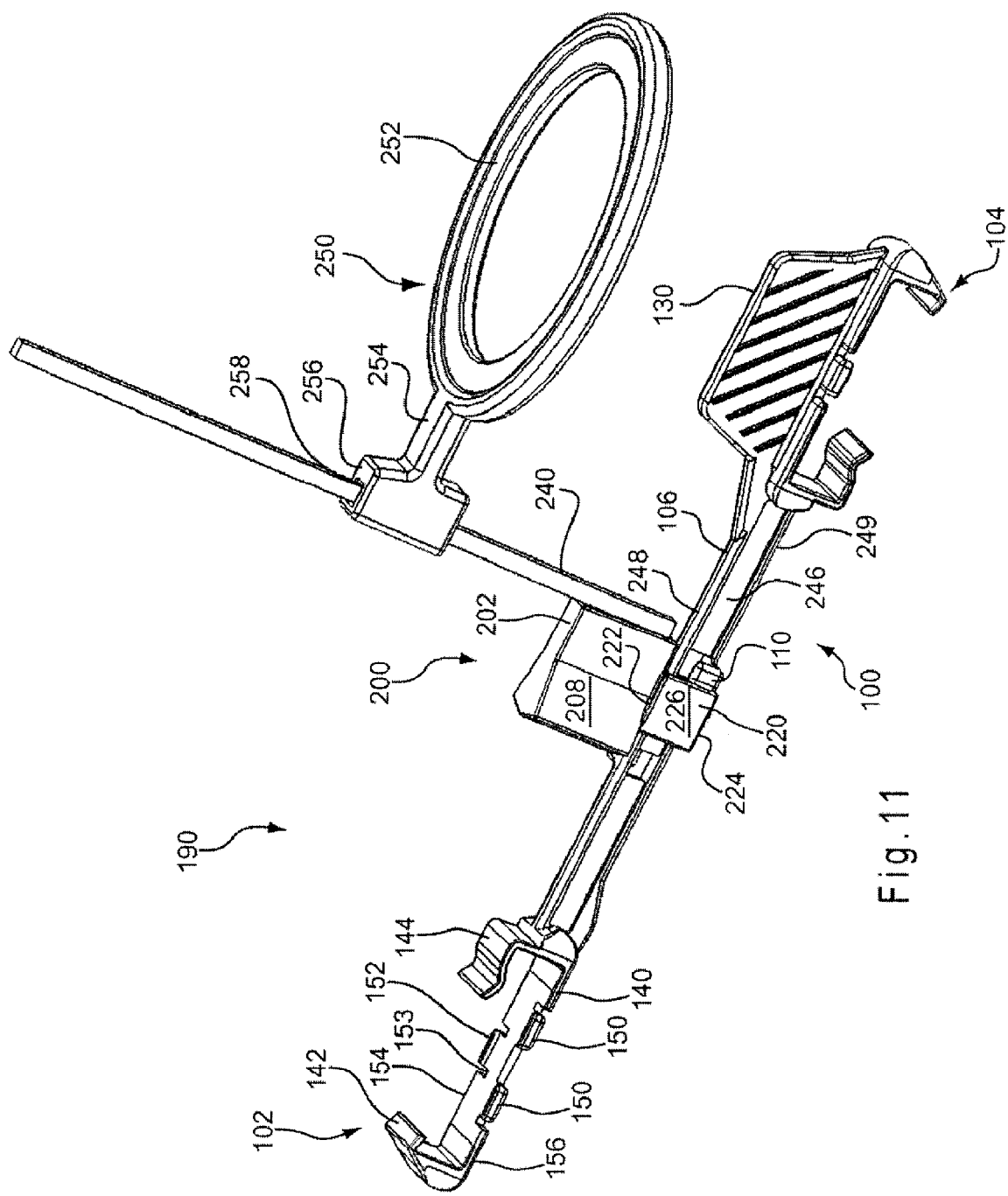
FIG. 11 depicts a first perspective view of a holder for an x-ray sensor and/or an x-ray film unit connected with a ring guide using a ring guide adapter, in accordance with one preferred embodiment of the invention.

In one embodiment, a system 190 for holding and aligning an x-ray sensing device 120 is provided, as shown in FIG. 11. The system 190 includes the holder 100 for the x-ray sensing device 120, a ring guide adapter 200 removably connected with the holder 100, a rod 240 removably connected with the ring guide adapter 200, and a ring guide 250 which is slidably connected with the rod 240.

Figure 12:
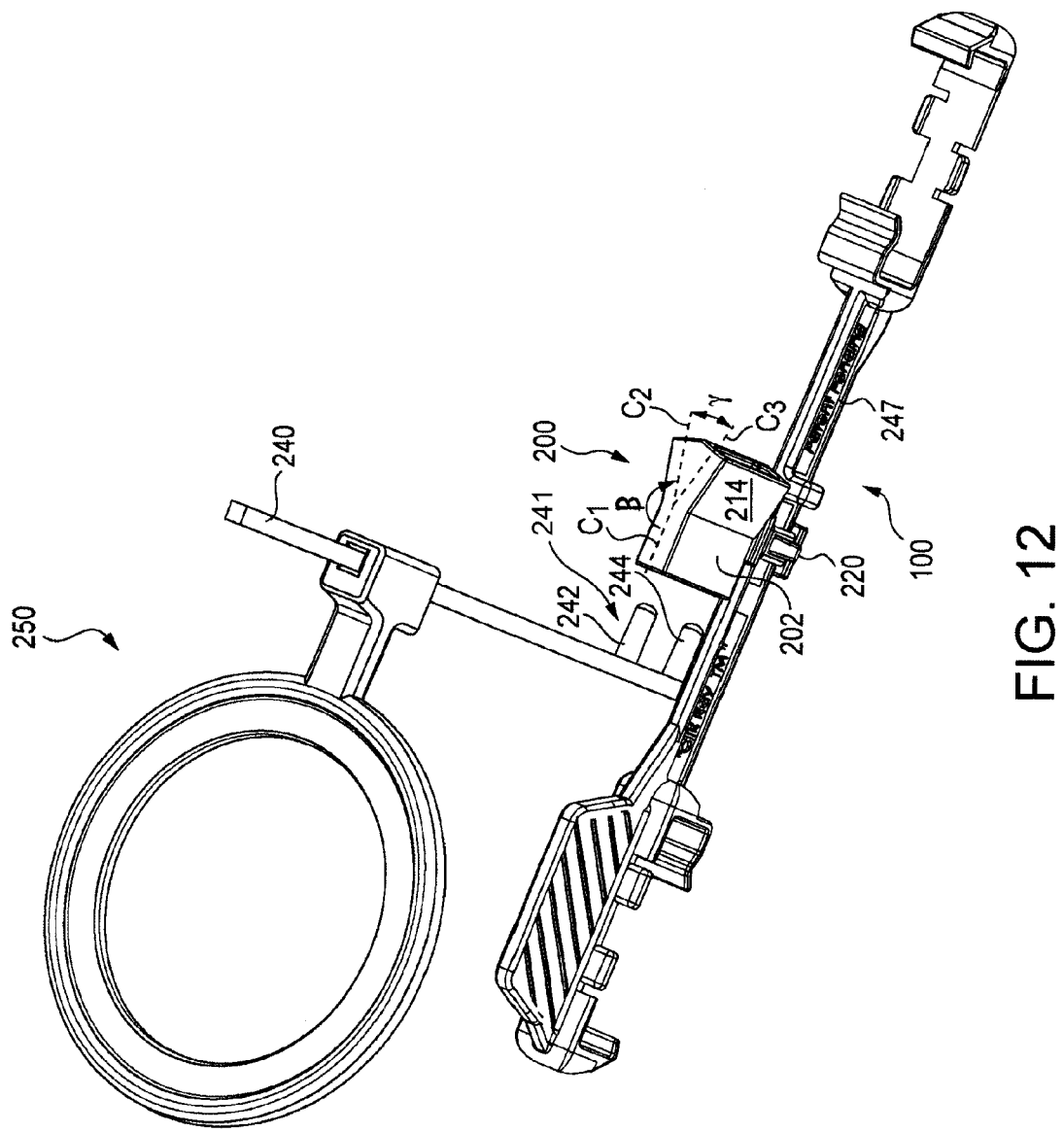
FIG. 12 depicts a perspective view of the ring guide adapter of FIG. 11 being connected with a rod and a ring guide holder at a first alignment member, in accordance with one preferred embodiment of the invention.
Figure 13:
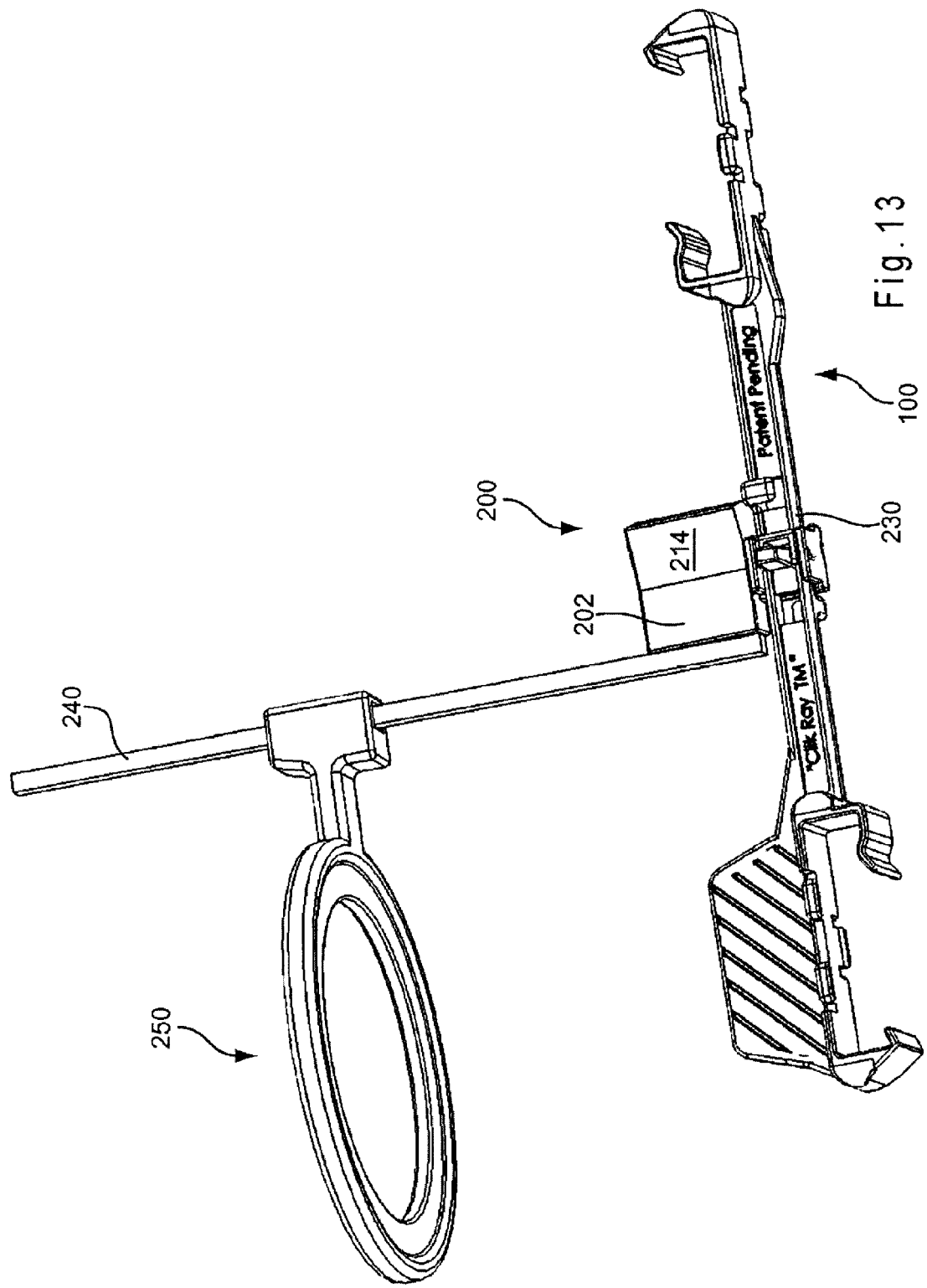
FIG. 13 depicts a second perspective view of a holder for an x-ray sensor and/or an x-ray film unit connected with a ring guide using a ring guide adapter, in accordance with one preferred embodiment of the invention.
Figure 20:
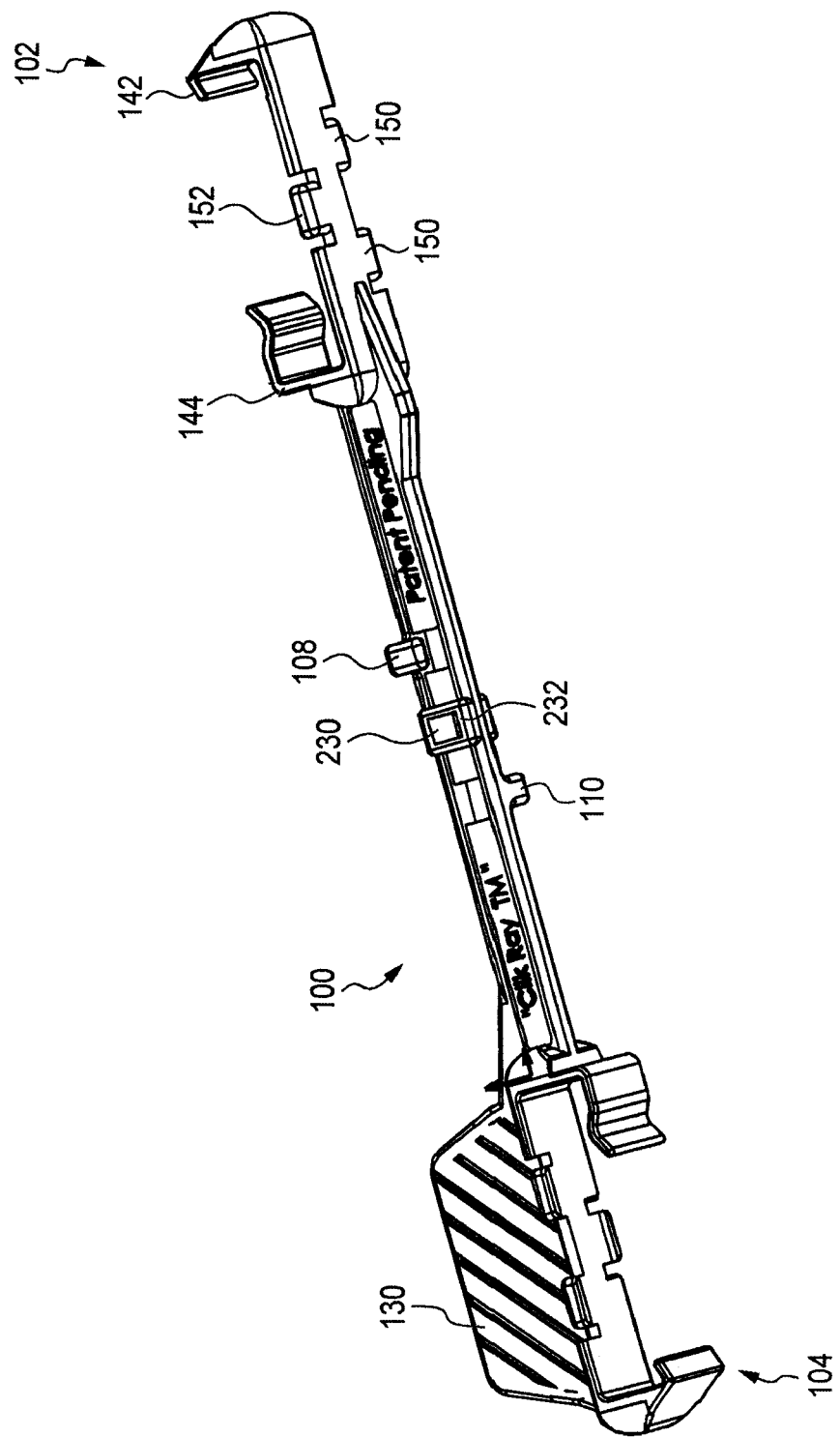
FIG. 20 depicts an enlarged perspective view of the holder for an x-ray sensor and/or an x-ray film unit of FIG. 11, in accordance with one preferred embodiment of the invention.

While in this embodiment, the system 190 includes the holder 100, any device which can hold an x-ray sensing device 120 can be used in substitution for the holder 100, such as U.S. Pat. No. 2,239,569, U.S. Pat. No. 2,240,336, U.S. Pat. No. 4,484,342, U.S. Pat. No. 4,489,427, U.S. Pat. No. 4,965,885, U.S. Pat. No. 5,090,047, U.S. Pat. No. 5,677,537, and U.S. Pat. No. 6,461,038. The holder 100 includes at least one retention member 102 for holding an x-ray sensing device 120 and a handle 106 connected with the retention member 102, as shown in FIG. 20. In this embodiment, the holder 100 also includes an engagement member 230. As used herein, an engagement member, such as the engagement member 230, may be any device which is adapted to removably connect with another device, and includes such thing as: mechanical fasters including hook and loop type fasters such as VELCRO™, projecting members such as keys, channels and cavities such as key-holes, snap-fit arrangements, a frictional arrangement which includes members which frictionally engage each other, screws, nails, nuts and bolts, hydraulic engagement; chemical fasteners such as epoxy or other types of glue, solder or other types of welding engagements; magneto-electrical fasteners such as magnets, electrical magnets, and charged couplings. Preferably, the engagement member 230 is a channel 232 which goes into or through the handle 106, as shown in FIG. 20. The engagement member connects with and mates with a complimentary engagement member 220 of the ring guide adapter 200, as shown in FIGS. 11-13.

Figure 15:
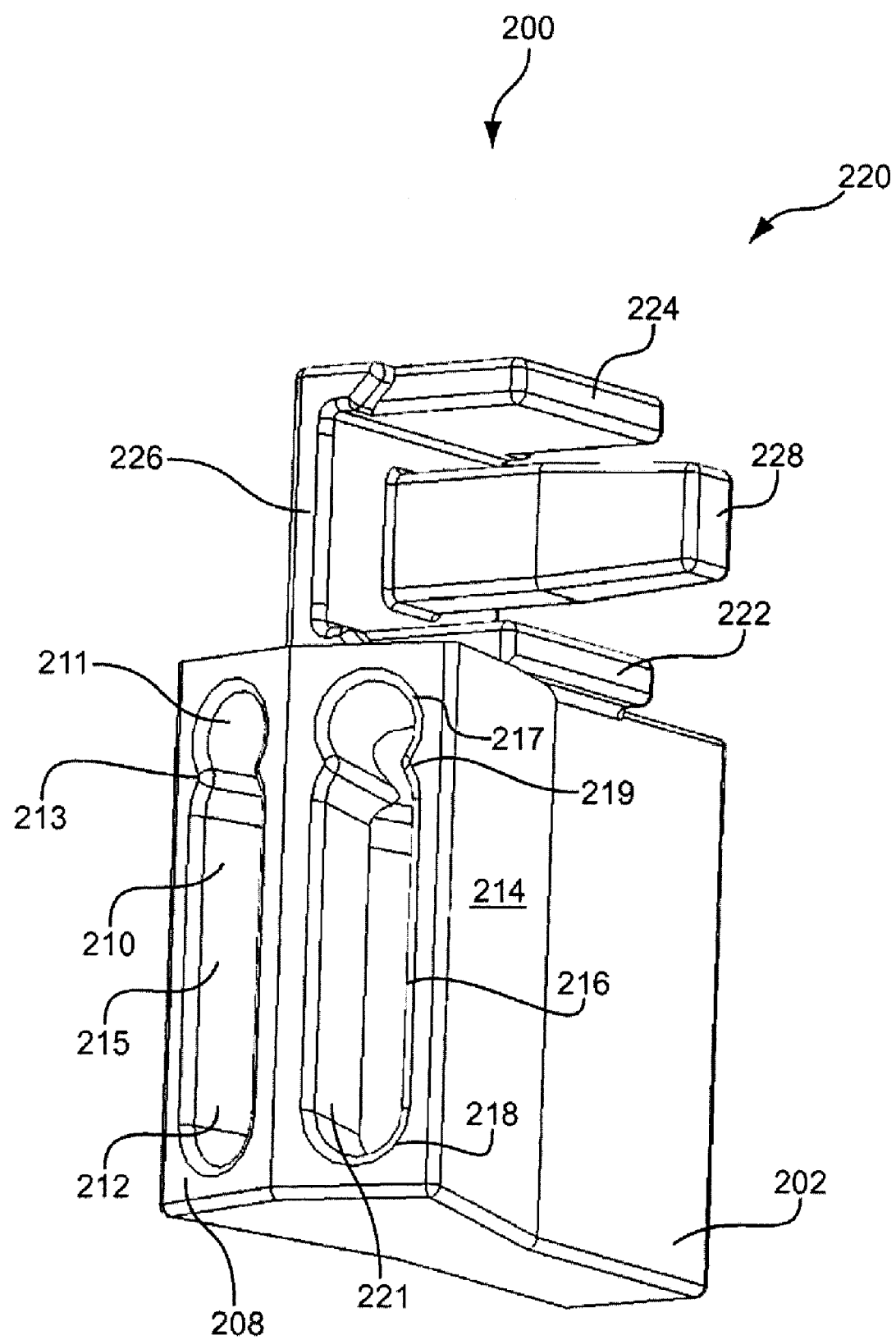
FIG. 15 depicts an enlarged first perspective view of the ring guide adapter of FIG. 11, in accordance with one preferred embodiment of the invention.
Figure 16:
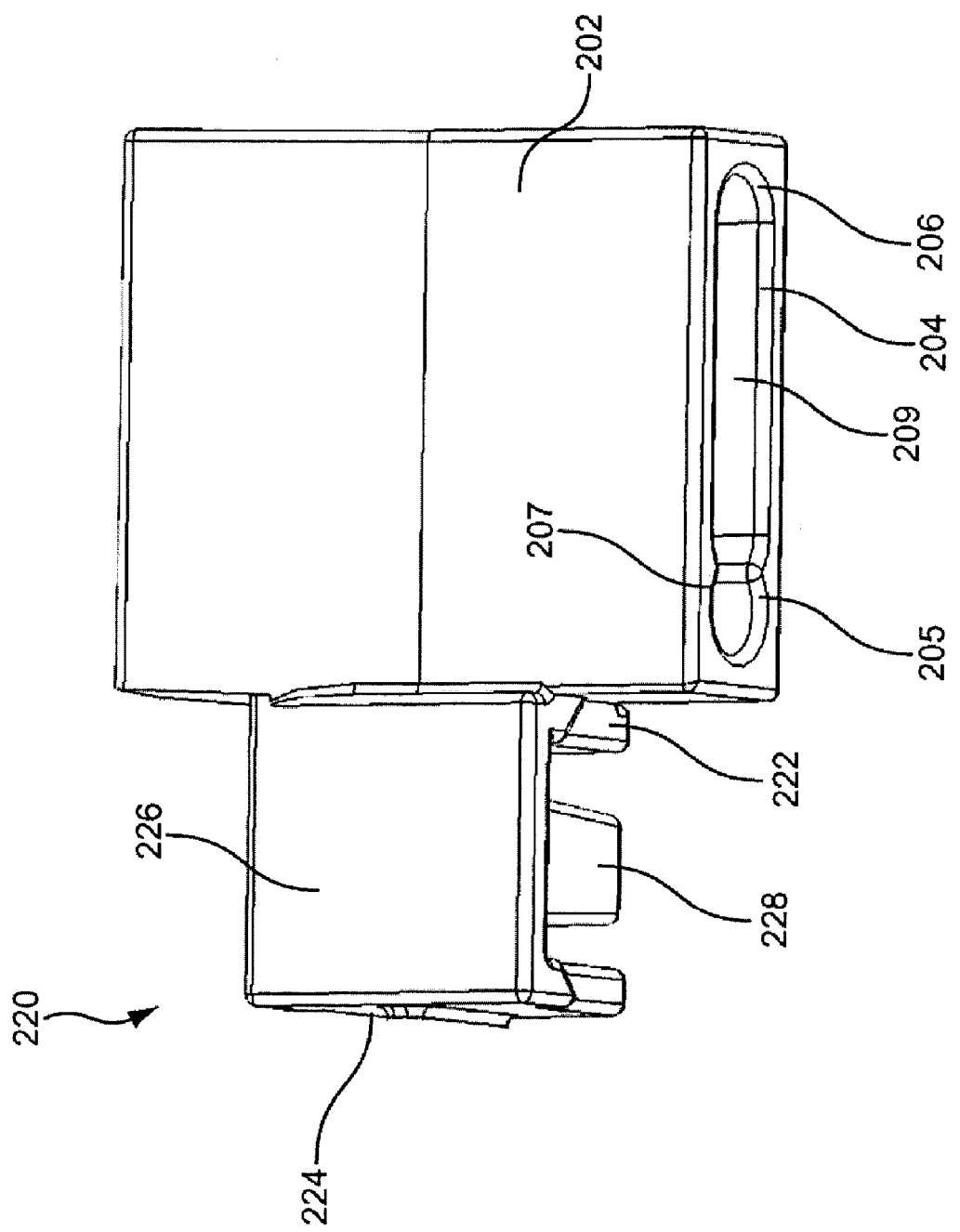
FIG. 16 depicts an enlarged second perspective view of the ring guide adapter of FIG. 11, in accordance with one preferred embodiment of the invention.
Figure 17:
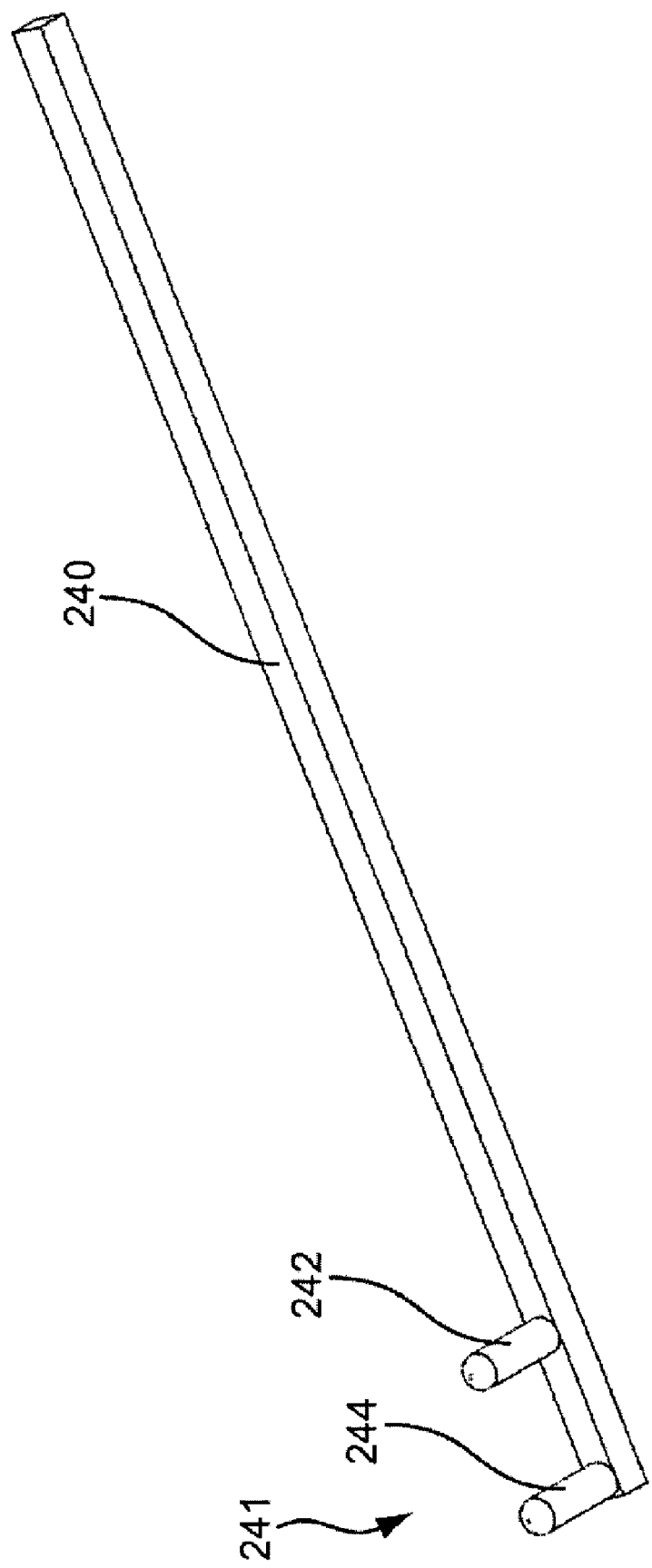
FIG. 17 depicts an enlarged perspective view of the rod of FIG. 12, in accordance with one preferred embodiment of the invention.

The ring guide adapter 200 includes first, second and third alignment members 202, 208, 214. Each alignment member 202, 208, 214 includes an engagement member 204, 210, 216, respectively, which is removably connected with and mates with a complimentary engagement member 241 on the rod 240, as shown in FIGS. 12 and 17. Preferably, the engagement members 204, 210, 216 are cavities 209, 215, 221 which are formed in each respective engagement member 204, 210, 216. Preferably, the cavities 209, 215, 221 receiving a pair of projections 242, 244 of the engagement member 241. In order to insure a snug fit, in one embodiment, the cavities 209, 215, 221 are formed in the shape of a key-hole and include semicircular upper portions 205, 211, 217 which are connected with generally U-shaped lower portions 206, 212, 218 through a pair of bends 207, 213, 219, respectively, as shown in FIGS. 15 and 16.

Rod 240 connects the ring guide 250 with the handle 106 through the use of the adapter 200. Preferably, the rod 240 is composed of a rigid material such as a metal like aluminum, steel, or nickel. The rod 240 allows the ring guide 250 to be positioned a distance away from either the first or second retention member 102, 104. Preferably, the rod 240 is slidably connected with the ring guide 250 through a channel 258 which is formed through a connecting portion 254 of the ring guide 250, as shown in FIG. 11. This allows the distance between the ring guide 250 and either the first or second retention member 102, 104 to be varied.

The rod 240 is removably connected with either the first, second or third alignment members 202, 208, 214 of the ring guide adapter 200. More specifically, the rod 240 includes engagement member 241, which is preferably positioned at one end of the rod 240, and which mates with one of the engagement members 204, 210, 216 on the adapter 200, as discussed above. The rod 240 preferably has a multi-sided cross section, such as a square cross-section, to prevent the ring guide 250 from rotating on the rod 240 and to provide precise alignment between the first or second retention member 102, 104 and the ring guide 250. The rod 240 and the ring guide 250 can be any standard or known arrangement of rods and ring guides and includes such devices as those shown in U.S. Pat. No. 3,473,026; the XCP Film Holding System manufactured by Dentsply Rinn™ of Elgin, Ill.; and the RAPD Positioning System™ manufactured by Flow X-Ray Corporation of Deer Park, N.Y.

The ring guide 250 is used to precisely aim an x-ray machine at and direct x-rays from the x-ray machine to either retention member 102, 104. The ring guide 250 includes a guide 256 which is slidably connected with the rod 240, a ring 252, and a connecting portion 254 connecting the ring 252 to the guide 256, as shown in FIGS. 11-14. The guide 256 forms a channel 258 through which the rod 240 is positioned. In this manner, the rod 240 is slidably engaged with and connected with the ring guide 250. The ring 252 is a generally circular member which is used to aim and align an x-ray cone of an x-ray machine with either retention member 102, 104, so that x-rays emitted from the machine are precisely directed towards the x-ray sensing device 120 situated in either retention member 102, 104.

Figure 14:
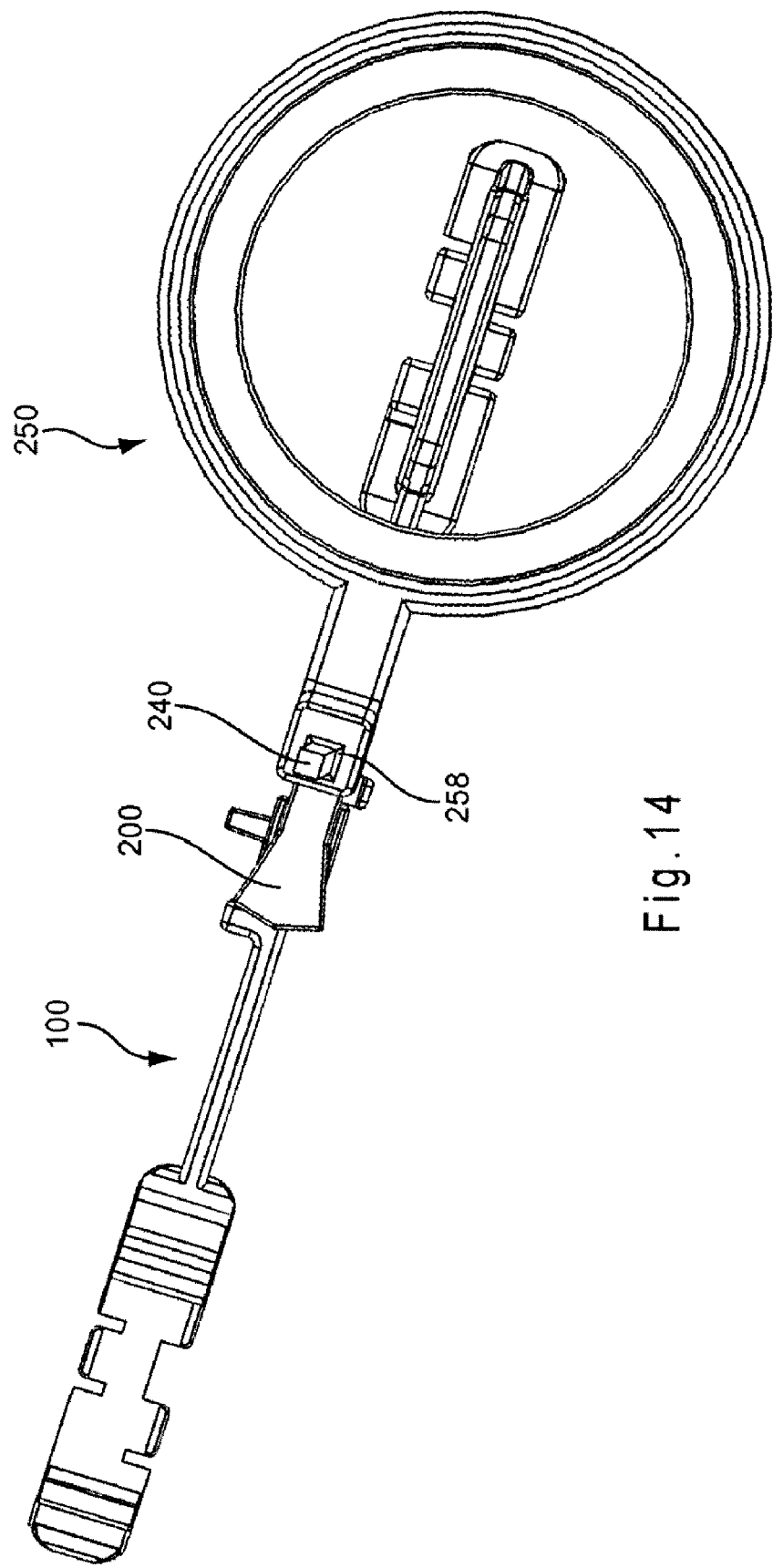
FIG. 14 depicts a side view of the holder for an x-ray sensor and/or an x-ray film unit connected with the ring guide in a first position using the ring guide adapter of FIG. 11, in accordance with one preferred embodiment of the invention.
Figure 18:
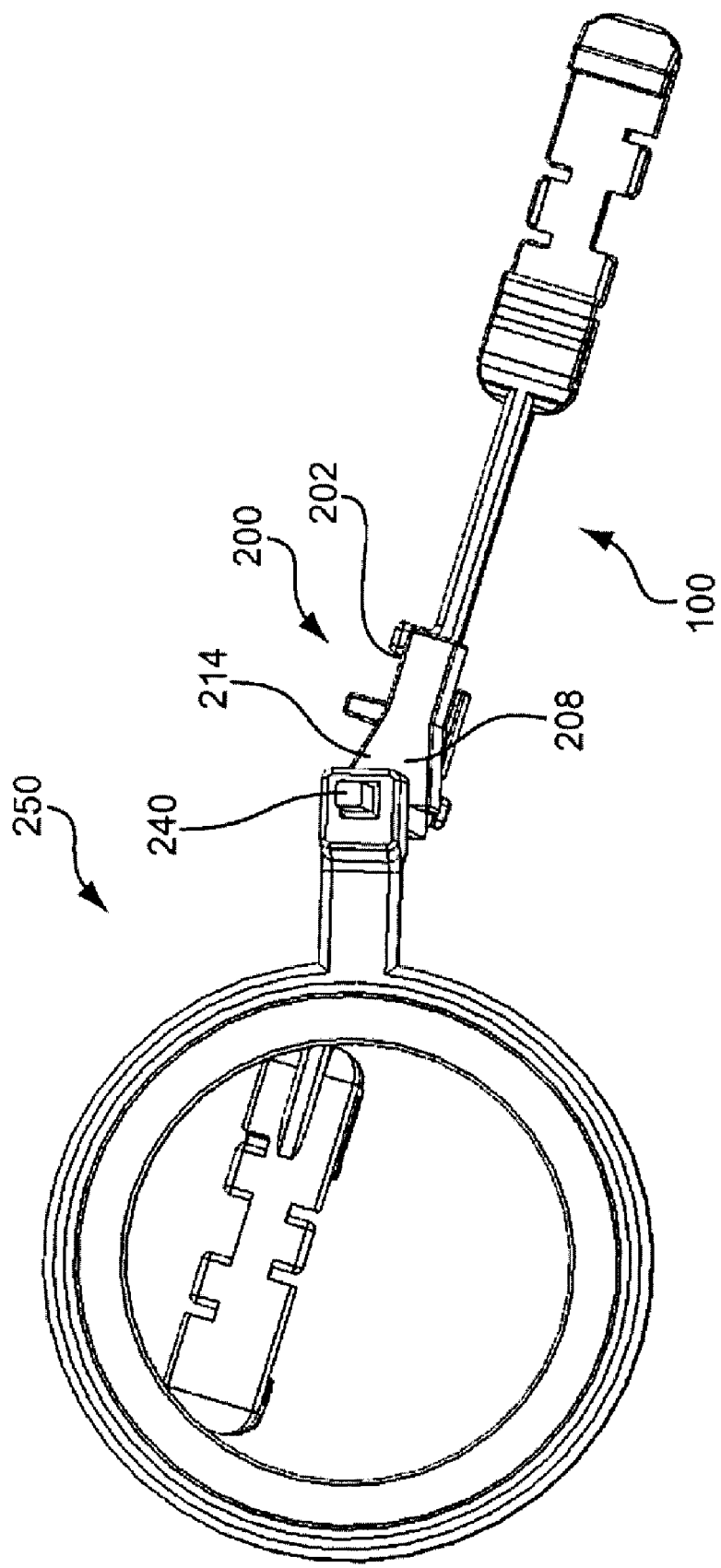
FIG. 18 depicts a side view of the holder for an x-ray sensor and/or an x-ray film unit connected with the ring guide in a second position using the ring guide adapter of FIG. 11, in accordance with one preferred embodiment of the invention.
Figure 19:
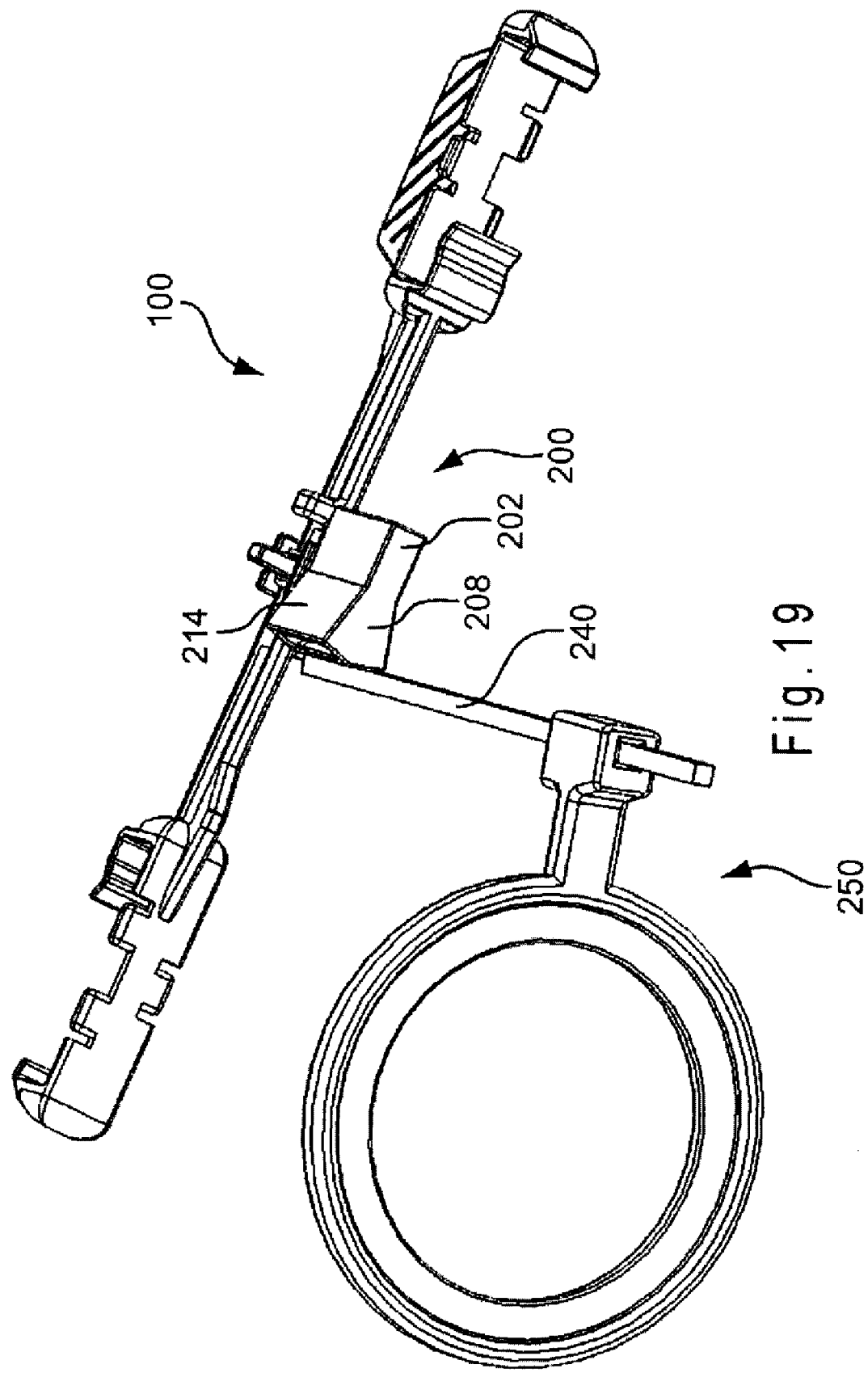
FIG. 19 depicts a perspective view of the holder for an x-ray sensor and/or an x-ray film unit connected with the ring guide in a second position using the ring guide adapter of FIG. 11, in accordance with one preferred embodiment of the invention.
Figure 21:
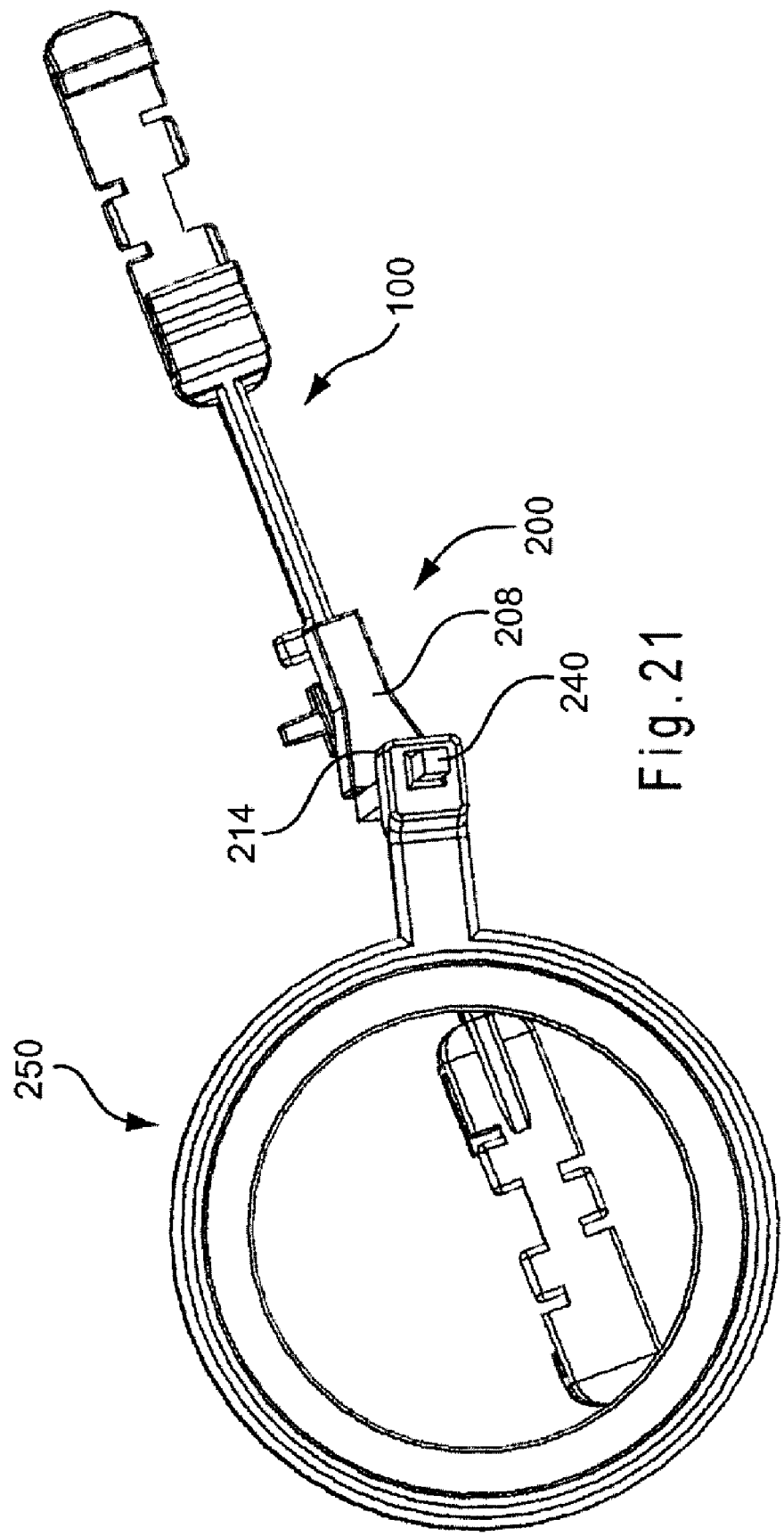
FIG. 21 depicts a side view of the holder for an x-ray sensor and/or an x-ray film unit connected with the ring guide in a third position using the ring guide adapter of FIG. 11, in accordance with one preferred embodiment of the invention.
Figure 22:
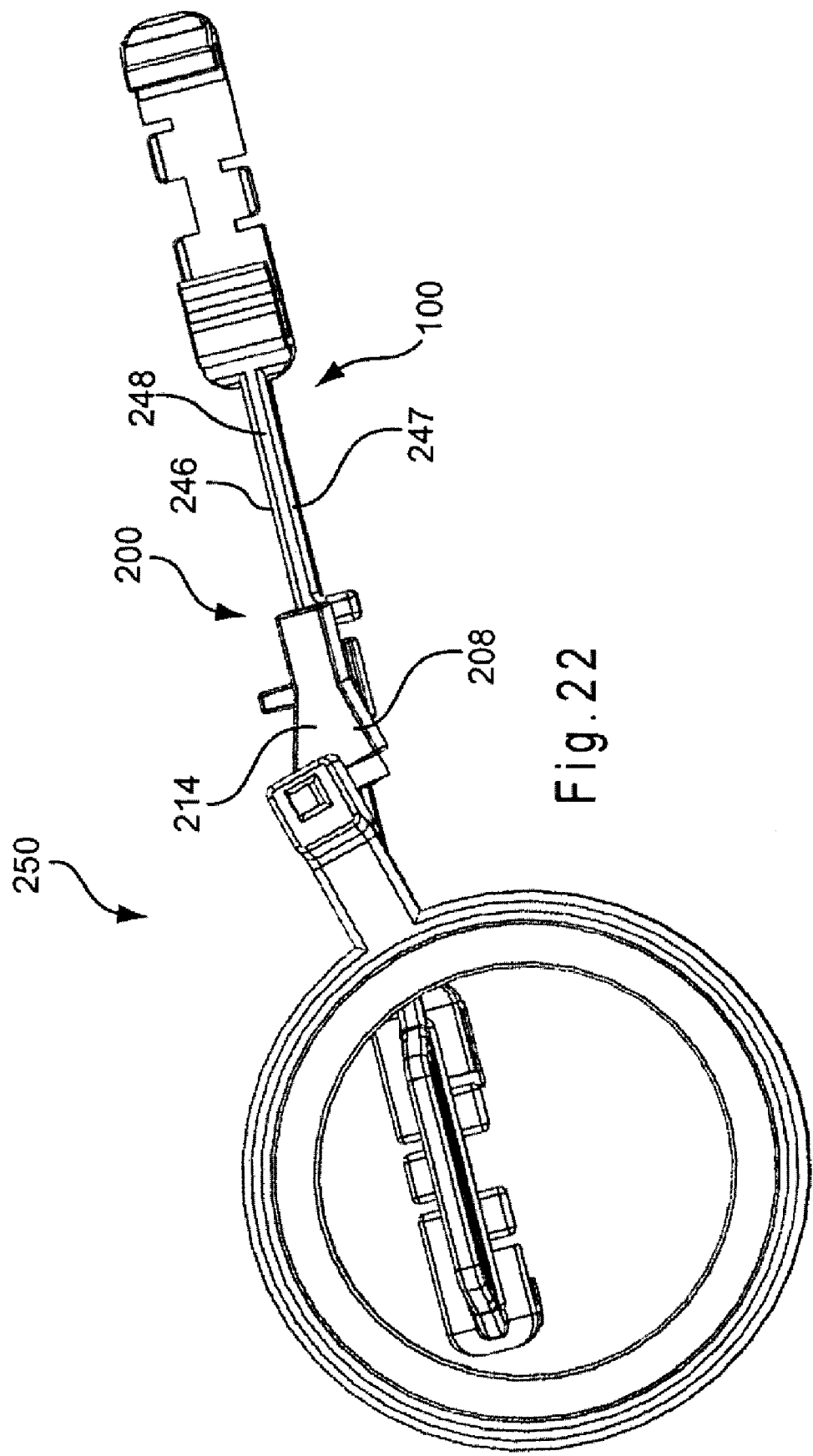
FIG. 22 depicts a side view of the holder for an x-ray sensor and/or an x-ray film unit connected with the ring guide in a fourth position using the ring guide adapter of FIG. 11, in accordance with one preferred embodiment of the invention.
Figure 23:
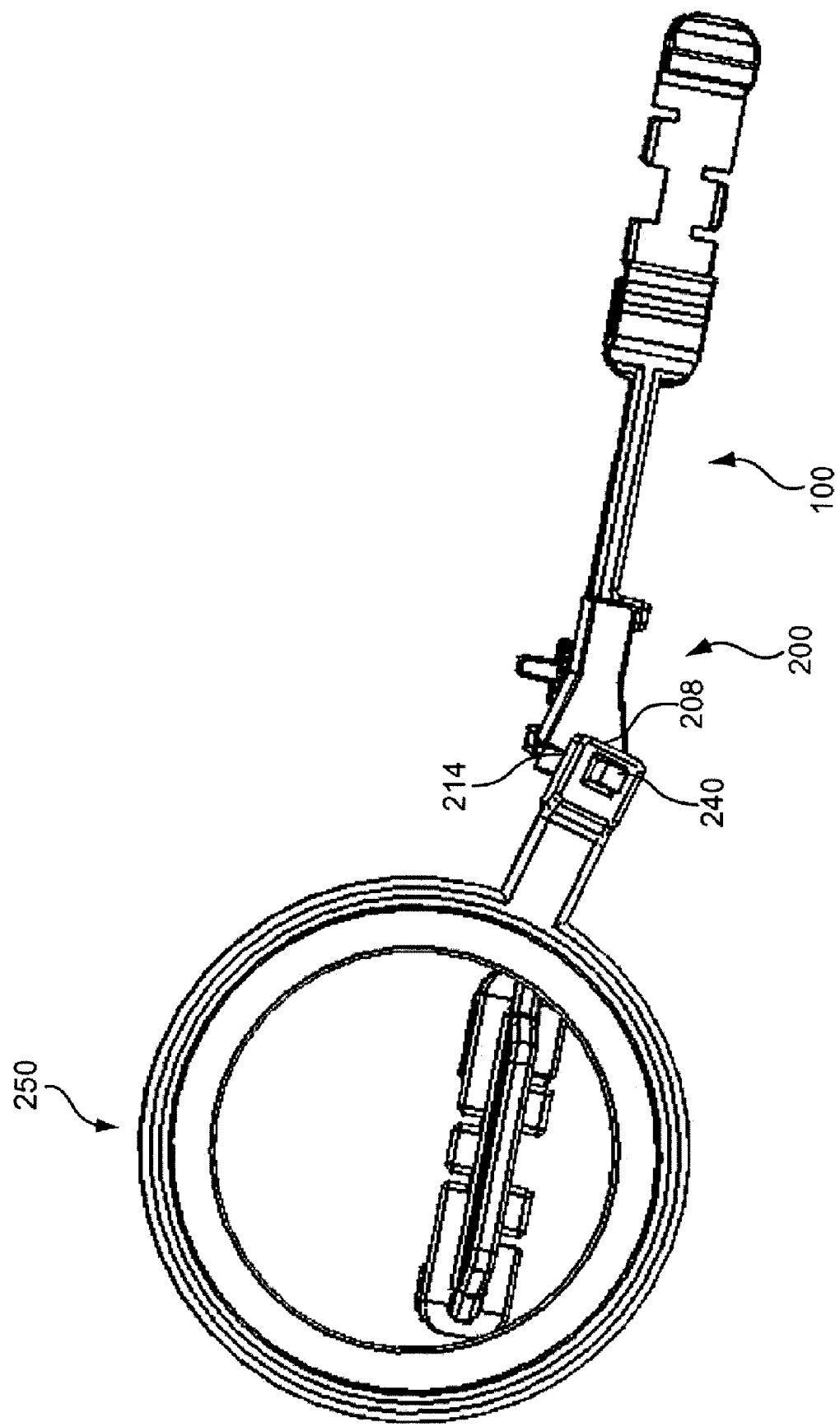
FIG. 23 depicts a side view of the holder for an x-ray sensor and/or an x-ray film unit connected with the ring guide in a fifth position using the ring guide adapter of FIG. 11, in accordance with one preferred embodiment of the invention.

There are three basic positions to place the ring 252 in with respect to either retention member 102, 104 for taking three basic types of x-rays: 1) a central position in which the ring 252 is aimed at the center of either retention member 102, 104 for taking bite wing or anterior type x-rays, as shown in FIG. 14, a lower position in which the ring 252 is aimed at the a lower portion of either retention member 102, 104 for taking lower posterior type x-rays, as shown in FIGS. 18, 19 and 22; and an upper position, which is opposite the lower position, in which the ring 252 is aimed at an upper portion of either retention member 102, 104 for taking upper posterior type x-rays, as shown in FIGS. 21 and 23. Preferably, the first, second, and third alignment members 202, 208, 214 are positioned on the ring guide adapter 200 so that when the rod 240 is removably connected with the first alignment member 202, the ring guide 250 is positioned for a first x-ray type, such as a bite wing or anterior type x-ray; so that when rod 240 is removably connected with the second alignment member 208, the ring guide 250 is positioned for a second x-ray type, such as a lower posterior type x-ray; and so that when rod 240 is removably connected with the third alignment member 214, the ring guide 250 is positioned for a third x-ray type, such as a upper posterior type x-ray.

The ring guide adapter 200 is removably connected with the engagement member 230 of the holder 100 through a complimentary engagement member 220. Preferably, the engagement member 220 is a frictional arrangement which includes a lower plate 222 connected with an upper plate 224 through a connecting plate 226, and includes a projecting member 228 which is connected with and extends away from a surface of the connecting plate 226 and between the lower and upper plates 222, 224, as shown in FIGS. 15 and 16. When connecting the engagement member 220 of the adapter 200 with the engagement member 230 of the holder 100, the projecting member 228 is inserted into and through the channel 232, as shown in FIGS. 12 and 13. Additionally, lower, upper, and connecting plates 222, 224, 226 partially surround and engage lower, upper, and left or right sides 249, 248, 246, 247 of the handle 106 of the holder 100, as shown in FIGS. 11-13. In this manner, the ring guide adapter is able to be removably connected with the holder 100. Preferably, the channel 232 and the projecting member 228 are designed in such a way so that the projecting member can be inserted in at least one of two different ways.

For example, in one embodiment, the projecting member 228 has a rectangular cross section which mates with a rectangular cross section of the channel 232 in one of four ways. In a first way, the projecting member 228 is inserted into the channel 232 so that the lower plate 222 engages the upper side 248, the upper plate 224 engages the lower side 249, and the connecting plate 226 engages the left side 246 of the holder 106, as shown in FIG. 11. This arrangement allows the ring guide 250 to align with a central portion of the second retention member 104 by mating the rod 240 with a first alignment member 202 of the ring guide adapter 200 in order to take central bite wing or anterior type x-rays which are positioned to capture portions of both the upper and lower teeth of a person's mouth. In a second way, the projecting member 228 is inserted into the channel 232 so that the lower plate 222 engages the upper side 248, the upper plate 224 engages the lower side 249, and the connecting plate 226 engages the right side 247 of the holder 106, as shown in FIGS. 22 and 23. This arrangement allows the ring guide 250 to align with either an lower or upper portion of the second retention member 104 by mating the rod 240 with either a second or third alignment member 208, 214 of the ring guide adapter 200 in order to take, respectively, either lower posterior x-rays which are positioned to mainly capture portions of the lower teeth of a person's mouth, or upper posterior x-rays which are positioned to mainly capture portions of the upper teeth of a person's mouth.

In a third way, the projecting member 228 is inserted into the channel 232 so that the lower plate 222 engages the lower side 249, the upper plate 224 engages the upper side 248, and the connecting plate 226 engages the left side 246 of the holder 106. This arrangement allows the ring guide 250 to align with a central portion of the first retention member 102 by mating the rod 240 with the first alignment member 202 of the ring guide adapter 200 in order to take central bite wing or anterior type x-rays which are positioned to capture portions of both the upper and lower teeth of a person's mouth. In a fourth way, the projecting member 228 is inserted into the channel 232 so that the lower plate 222 engages the lower side 249, the upper plate 224 engages the upper side 248, and the connecting plate 226 engages the right side 247 of the holder 106, as shown in FIGS. 18, 19 and 21. This arrangement allows the ring guide 250 to align with either a lower or upper portion of the first retention member 102 by mating the rod 240 with either the second or third alignment member 208, 214 of the ring guide adapter 200 in order to take, respectively, either lower posterior x-rays which are positioned to mainly capture portions of the lower teeth of a person's mouth, or upper posterior x-rays which are positioned to mainly capture portions of the upper teeth of a person's mouth.

In one embodiment, the first, second, and third alignment members 202, 208, 214 are position in a Y-shaped arrangement, as shown in FIG. 12. In this arrangement, the first alignment member 202 is opposed to the second and third alignment members 208, 214. Wherein the first alignment member 202 is aligned along a first centerline $C_1$, the second alignment member 208 is aligned along a second centerline $C_2$, and the third alignment member 214 is aligned along a third centerline $C_3$. An angle a is formed between the second and third alignment members 208, 214, and more specifically between the second and third centerlines $C_2$, $C_3$. Preferably, the angle $\alpha$ is chosen so as to precisely position the ring guide 250 for second and third x-ray types. An angle $\beta$ is formed between the first and second alignment members 202, 208, and more specifically between the first and second centerlines $C_1$, $C_2$. Preferably, the angle $\beta$ is chosen so as to precisely position the ring guide 250 for first and second x-ray types. Preferably, the angle $\alpha$ is between 5 and 90 degrees, and more preferably between 10 and 50 degrees, and most preferably about 30 degrees. Preferably, the angle $\beta$ is between 100 and 180 degrees, and more preferably between 120 and 170 degrees, and most preferably about 165 degrees.

Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

What is claim is:

1. A system for holding and aligning an x-ray sensing device comprising:

a holder for an x-ray sensing device;

a ring guide adapter which is removably connected with the holder, the ring guide adapter forming first and second alignment members; and a rod which is removably connected with either the first or second alignment member of the ring guide adapter, wherein the first alignment member is aligned to a first centerline $C_1$, the second alignment member is aligned to a second centerline $C_2$, an angle $\alpha$ is formed between the first and second centerlines $C_1$, $C_2$, and the angle $\alpha$ is between 5 and 90 degrees.

2. The system for holding and aligning an x-ray sensing device of claim 1, wherein the holder forms a first engagement member configured to mate with a complimentary second engagement member on the ring guide adapter.

3. The system for holding and aligning an x-ray sensing device of claim 1, wherein the first and second alignment members form first and second engagement members, respectively, and wherein at least one of the first engagement member or the second engagement member is configured to mate with a complimentary third engagement member formed on the rod.

4. The system for holding and aligning an x-ray sensing device of claim 1 further comprising a ring guide connected with the rod.

5. The system for holding and aligning an x-ray sensing device of claim 4, wherein the first and second alignment members are positioned on the ring guide adapter so that when the rod is removably connected with the first alignment member the ring guide is positioned for a first x-ray type, and so that when the rod is removably connected with the second alignment member the ring guide is positioned for a second x-ray type.

6. The system for holding and aligning an x-ray sensing device of claim 5, wherein the first x-ray type is one of an upper posterior, a lower posterior, an anterior, and a bite wing type x-ray.

7. A ring guide adapter comprising:

a first alignment member forming a first engagement member configured to mate with a complimentary second engagement member formed on a rod;

a second alignment member connected with the first alignment member, the second alignment member forming a third engagement member also configured to mate with the complimentary second engagement member formed on the rod; and a fourth engagement member configured to mate with a complimentary fifth engagement member of a holder for an x-ray sensing device, wherein the first alignment member is aligned to a first centerline $C_1$, the second alignment member is aligned to a second centerline $C_2$, an angle $\alpha$ is formed between the first and second centerlines $C_1$, $C_2$, and the angle $\alpha$ is between 5 and 90 degrees.

8. The ring guide adapter of claim 7, wherein the second engagement member formed on the rod includes first and second protrusions.

9. The ring guide adapter of claim 7, wherein the rod is connected with a ring guide.

10. The ring guide adapter of claim 9, wherein the first and second alignment members are positioned on the ring guide adapter so that when the rod is removably connected with the first alignment member the ring guide is positioned for a first x-ray type, and so that when the rod is removably connected with the second alignment member the ring guide is positioned for a second x-ray type.

11. The ring guide adapter of claim 9, wherein the first alignment member is configured to align the ring guide to the holder for a first x-ray type when the second engagement member on the rod is mated with the first engagement member, and wherein the second alignment member is configured to align the ring guide to the holder for a second x-ray type when the second engagement member on the rod is mated with the third engagement member.

12. The ring guide adapter of claim 7 further comprising a third alignment member connected with the first and second alignment members, the third alignment member forming a sixth engagement member also configured to mate with the complimentary second engagement member formed on the rod.

13. The ring guide adapter of claim 12, wherein the first engagement member is opposed to the third and sixth engagement members.

14. A ring guide adapter for connecting a rod and ring guide with a holder for an x-ray sensing device, the ring guide adapter comprising:

a first alignment member including a first engagement member configured to mate with a complimentary second engagement member formed on the rod to align the rod for a first x-ray type; and a second alignment member connected with the first alignment member, the second alignment member including a third engagement member configured to mate with the complimentary second engagement member formed on the rod to align the rod for a second x-ray type, wherein the first alignment member is aligned to a first centerline $C_1$, the second alignment member is aligned to a second centerline $C_1$, an angle $\alpha$ is formed between the first and second centerlines $C_1$, $C_2$, and the angle $\alpha$ is between 5 and 90 degrees.

15. The ring guide adapter of claim 14 further comprising a third alignment member connected with at least one of the first and second alignment members, the third alignment member including a fourth engagement member configured to mate with the complimentary second engagement member formed on the rod to align the rod for a third x-ray type.

16. The ring guide adapter of claim 15, wherein the first x-ray type is a bite wing or anterior type x-ray, wherein the second x-ray type is a lower posterior type x-ray, and wherein the third x-ray type is an upper posterior type x-ray 17. The ring guide adapter of claim 14 further comprising a fourth engagement member configured to mate with a complimentary fifth engagement member of the holder.

18. The ring guide adapter of claim 14, wherein the second engagement member formed on the rod includes first and second protrusions.

19. The ring guide adapter of claim 14, wherein the first and third engagement members are cavities which mate with the second engagement member formed on the rod.

20. The ring guide adapter of claim 19, wherein the second engagement member formed on the rod includes at least one projection.

* * * * *